Feb. 10, 1959 J. B. SPELLER 2,873,440

ANALOGUE-TO-DIGITAL CONVERTER

Filed Oct. 26, 1954 5 Sheets-Sheet 1

INVENTOR.
JACK B. SPELLER
BY [signature]
ATTORNEY

Feb. 10, 1959 J. B. SPELLER 2,873,440

ANALOGUE-TO-DIGITAL CONVERTER

Filed Oct. 26, 1954 5 Sheets-Sheet 2

INVENTOR.
JACK B. SPELLER
BY Henry L. Shenier
ATTORNEY

INVENTOR.
JACK B. SPELLER
BY [signature]
ATTORNEY

Feb. 10, 1959 J. B. SPELLER 2,873,440

ANALOGUE-TO-DIGITAL CONVERTER

Filed Oct. 26, 1954 5 Sheets-Sheet 4

INVENTOR.
JACK B. SPELLER
BY Henry L. Shenier
ATTORNEY

INVENTOR.
JACK B. SPELLER
BY [signature]
ATTORNEY

United States Patent Office 2,873,440

Patented Feb. 10, 1959

2,873,440

ANALOGUE-TO-DIGITAL CONVERTER

Jack B. Speller, White Plains, N. Y., assignor, by mesne assignments, to United Aircraft Corporation, East Hartford, Conn., a corporation of Delaware Application October 26, 1954, Serial No. 464,774

28 Claims. (Cl. 340—347)

My invention relates to an analogue-to-digital converter and more particularly to a device which provides an accurate and unambiguous digital representation of mechanical displacement in the natural binary code.

In many pulse or D. C. circuits, it is desirable to produce voltages which constitute a digital representation, in the natural binary code, of mechanical displacement. For example, it is often desirable to represent the position of a shaft by signals which may be fed to a digital computer. If only a voltage analogue of shaft position were available, some external converter to change the voltage to a digital representation would be necessary. It is advantageous, therefore, to provide a device which directly transforms shaft position into voltages which constitute a digital representation in the natural binary code. If it be attempted to employ rotatable disks on which are mounted coded patterns which are engaged by stationary brushes to produce output voltages to constitute a digital, representation of shaft position, it would be essential that the brushes contacting the patterns be accurately aligned with the conducting segments and nonconducting spaces composing the pattern in order that an accurate representation be obtained. When a natural binary number changes from 01111=15 to 10000=16, all the "1's" of the first number must change to "0's" and the "0" to a "1." Such a situation occurs frequently in the naturaly binary code. If the brushes and segments of the converter are not perfectly aligned, very large errors in the output representation may result. This error will occur at a transfer point where rotation of the disk and its associated segments and spaces either causes a brush which had been previously contacting a space just to engage a segment, or causes a brush which had been previously contacting a segment just to engage a nonconductive space. Should the nonconducting spaces of the coded patterns of the disks of a converter be replaced by conducting segments to obtain, in addition, secondary output voltages which represent the "complement" of shaft position in the binary code, it will be appreciated that if a brush carrying a signal were to contact a pair of these adjacent segments, each of the output terminals associated with two segments would receive a signal, with the result that the output representations would be erroneous. By "complement" I mean a binary number obtained from that binary number representative of shaft position by reversing the polarity of each digit; that is, by changing each "0" to a "1" and by changing each "1" to a "0." For example, the complement of 0110=6 is 1001=9. The sum of that binary number representative of each shaft position and the associated complement is equal to the largest binary number possible with the given number of digits, that is, where all digits of the given binary number are "1." For example, 0110+1001=1111; 6+9=15. It will also be appreciated that some separation between these adjacent segments is necessary in order that a brush will not cause a short circuit between a pair of adjacent segments. If, however, this spacing is sufficient to prevent this short circuiting of adjacent segments, the representation provided by the converter will be discontinuous. That is, at a transfer point, the brush will lie between adjacent segments without contacting either of the segments. It can be seen that even where the brushes and disks of converters of the prior art are extremely accurately aligned, ambiguities will exist at the transfer points, where the engagement of a brush changes from one segment to an adjacent segment. Even were such ambiguities permissible, a converter requiring such accurate alignment would be, for all practical purposes, too costly and too critical to construct. There are occasions when at least one of the output digits should change from a "1" to a "0" or vice versa but does not. Larger or smaller errors in the output will result accordingly as this digit is a more or less significant digit.

I have invented a device which provides an accurate and unambiguous representation of mechanical displacement such as shaft position in the natural binary code in a simple, convenient, and inexpensive manner. The representation given by my converter is shifted instantaneously at a transfer point. My device is flexible, since as many binary digits as are desired may be provided. My device may be energized by direct current or pulse input signals. It requires little torque for rotation. The input shaft of my converter may be driven at high speed, and the response being substantially instantaneous, the output may be read while the shaft is moving.

One object of my invention is to provide a device which gives an accurate digital representation, in the natural binary code, of mechanical displacement.

A further object of my invention is to provide an analogue-to-digital converter which produces an unambiguous digital representation in the natural binary code of mechanical displacement.

Another object of my invention is to provide an analogue-to-digital converter which requires only a small driving torque.

Still another object of my invention is to provide an analogue-to-digital converter which consumes a negligible amount of power.

A still further object of my invention is to provide an analogue-to-digital converter which may be driven at high speed yet which may be read without arresting the input shaft.

Another object of my invention is to provide an analogue-to-digital converter which is small and light.

Other and further objects of my invention will appear from the following description.

In general, my invention contemplates the provision of a converter having a plurality of concentric coded conductive circles mounted on an insulating disk which is rotated by an input shaft. My converter gives a binary digital representation of the angular displacement of this shaft from a given zero position. The outermost circle or that of greatest circumference is composed of alternate equal lengths of arc of conductive segments and nonconductive spaces, and represents the least significant digit of the disk. The sum of these segments and spaces is the maximum count of the disk and is some integral power of the number "2." The number of concentric circles is equal to this integral power; and the count of each circle, proceeding from the outermost to the innermost circle, is diminished by a factor of two for each succeeding circle, so that the innermost circle or that of least circumference, which represents the most significant figure of the disk, has a count of two. For all but the outermost circle I replace nonconductive spaces by secondary conducting segments, from which I obtain the complement of shaft position in the binary code. For all but the outermost circle I connect all segments of each respective circle to one corresponding slip ring and all secondary segments of each respective circle to a corresponding secondary slip ring, from which slip rings I obtain direct and complementary outputs, respectively. All segments of the outermost circle are connected to a slip ring from which I obtain the direct output for the least significant figure.

My invention has two forms, which are analogous. The first form employs the conductive coupling of brushes to the disk segments and from the slip rings, and hence is adapted to both D. C. and pulse operation. The second form employs capacitive coupling by replacing the brushes with coupling segments which form, in conjunction with the disk segments and the slip rings, one plate of a capacitor, and is hence adapted only to pulse operation.

The input voltage is applied only to the segments of the least significant figure by means of an input brush or coupling segment. By means of auxiliary logic circuitry, from which I obtain a complementary output for the least significant figure, I simulate the presence and action of the secondary conducting segments and secondary output slip ring. For all circles except the outermost I employ two input brushes or coupling segments spaced apart one-half a segment length of the circle with which they are associated. The two inputs of a particular circle are taken from the two outputs of the preceding circle; one input being the direct output and the other input being the complementary output. The two inputs to a particular circle are aligned with the input to the outermost circle so that when the latter input reaches that transfer point which is also a transfer point for the particular circle, the two inputs symmetrically straddle the transfer point for the particular circle. That is to say, both inputs are one quarter of a segment distant from the transfer point of the circle, one input operating on a segment and the other operating on a secondary segment. When transfer takes place in the outermost circle, the inputs, which are always of opposite polarity either a "0" or a "1," will reverse in polarity. This action produces substantially instantaneous transfer and thus eliminates discontinuities and ambiguities by making it appear to the particular circle as if there were but one input which suddenly jumped from one segment to an adjacent secondary segment. The auxiliary logic circuitry also simulates this instantaneous transfer for the outermost circle where only one brush is provided.

In the accompanying drawings which form part of the instant specification and which are to be read in conjunction therewith, and in which like reference numerals are used to indicate like parts in the various views:

Figure 6 is a developed schematic view of another form of my analogue-to-digital converter in which capacitive coupling is employed.

Figure 1:
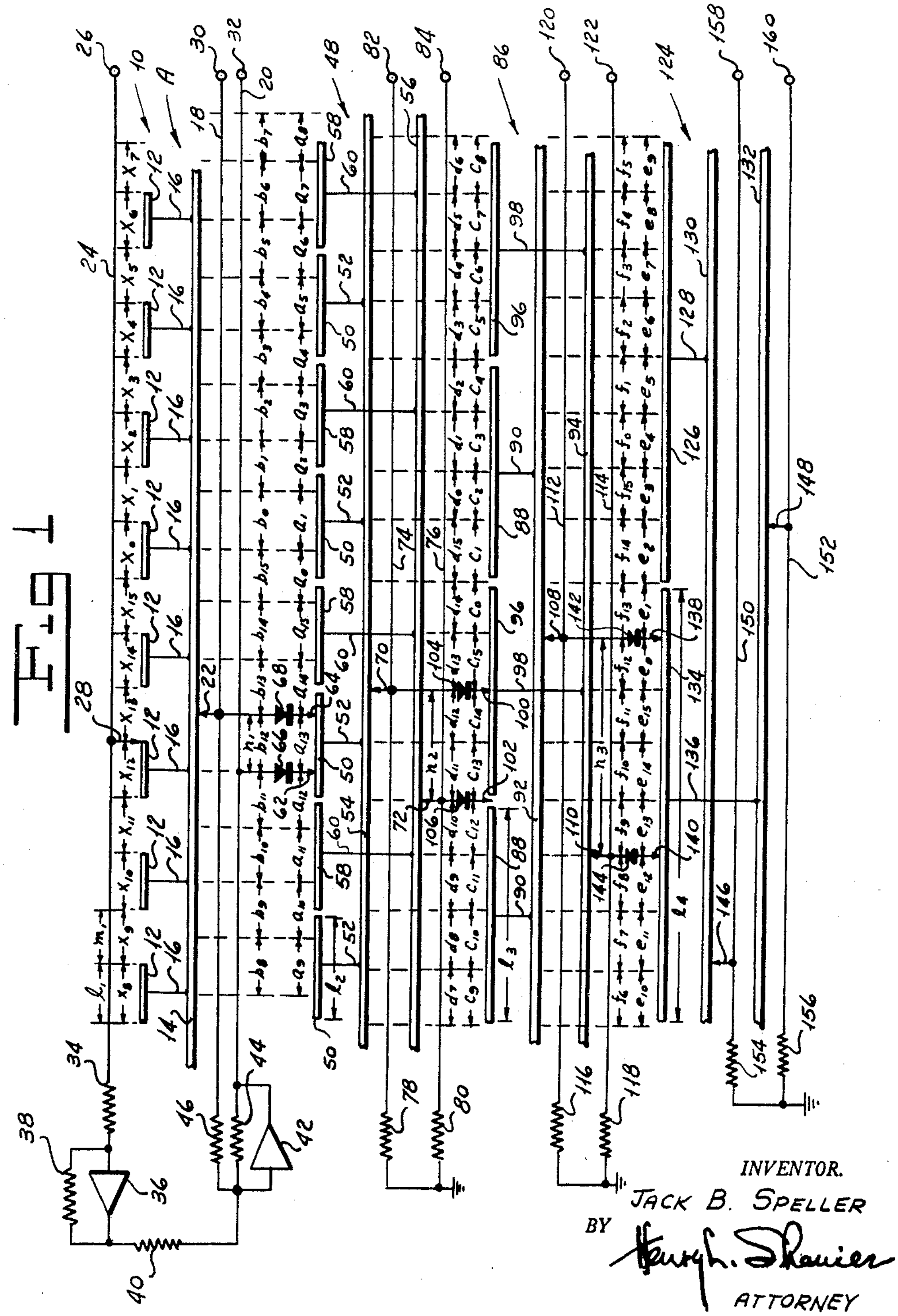
Figure 1 is a developed schematic view of the form of my analogue-to-digital converter which employs the conductive coupling of brushes.

More particularly referring now to Figure 1 of the drawings, I provide an outermost circle, indicated generally by the reference character 10, of movable segments 12 connected to a slip ring 14 by respective conductors 16. Also associated with the row 10 are a pair of output conductors 18 and 20. Conductor 18 is connected by a brush 22 to slip ring 14. A conductor 24 connects an input terminal 26 with a brush 28 positioned to engage the segments 12 as they move under the brush. It will be appreciated that when the brush 28 is in engagement with a segment 12, the signal input at terminal 26 will appear at output terminal 30 of line 18 by reason of the connection provided by slip ring 14 and brush 22. Each of the segments 12 has a predetermined length $l_1$. Adjacent segments 12 are separated by a distance $m_1$ which is equal to the length $l_1$.

As will be explained in detail hereinafter, either output terminal 30 associated with conductor 18 or an output terminal 32 associated with line 20 is selected to provide the least significant figure of the binary representation to be provided by the device. As succeeding numbers are represented, the selected terminal 30 or 32 alternately should have no output and should have an output. It will be appreciated that when a brush 28 engages a segment 12, terminal 30 has an output. When brush 28 is between adjacent segments 12, terminal 30 has no output. I have provided auxiliary logic circuitry for my input circuit to insure that terminal 32 has an output signal when terminal 30 has none. This circuit also ensures that terminal 32 has no output signal when terminal 30 does have an output signal, by virtue of the engagement of brush 28 with a segment 12. Conductor 24 is connected to the input resistor 34 of a high gain, D. C. inverting amplifier 36, across which feedback resistor 38 is connected. The output of amplifier 36 is connected to one input resistor 40 of a high gain, D. C. summing amplifier 42, across which feedback resistor 44 is connected. The output conductor 18 with which the terminal 30 is associated is connected to the other input resistor 46 of amplifier 42. Line 20 is connected to the output terminal of the amplifier 42. The input signal, which may be D. C. or a series of pulses, is applied to inverting amplifier 36 by input resistor 34. Amplifier 36 inverts this signal, and the inverted signal is applied to summing amplifier 42. I may conveniently make resistors 34, 38, 40, 46, and 44 all equal; consequently, high gain, D. C. amplifiers 36 and 42 have over-all gains of essentially unity. If brush 28 is in a position where it engages a segment 12, the input signal to terminal 26 is conducted to line 18 by brush 22. Resistor 46 impresses this signal on amplifier 42. Since an inverted input signal from amplifier 36 is at the same time applied to amplifier 42 by resistor 40, the two signal inputs to amplifier 42 cancel, and the amplifier produces a zero output signal. Consequently, when brush 28 engages a segment 12 so that terminal 30 of conductor 18 has an output signal, terminal 32 of a line 20 will have no output signal. At this time a "1" is represented at terminal 30 and a "0" is represented at terminal 32. My input circuit also ensures that terminal 32 will have an output signal when brush 28 is between adjacent segments 12 and terminal 30 has no output signal. Assuming brush 28 to be between adjacent segments 12, the input signal to terminal 26 is inverted by amplifier 36 and is applied to summing amplifier 42 by resistor 40. At this time, however, no signal will be applied to amplifier 42 by resistor 46, since brush 28 is between adjacent segments 12. The inverted signal applied to amplifier 42 by resistor 40 is again inverted by amplifier 42 and passes to the terminal 32 by line 20 where it represents a "1." At this time, since brush 28 is between adjacent segments 12, no output signal appears at terminal 30 so that a "0" is represented at this terminal. From the structure thus far described, it will be appreciated that one of the terminals always has an output signal. At no time, however, do both terminals have an output signal. As brush 28 alternately is engaged by a segment 12 and is disposed in the space between segments 12, terminal 30 alternately has an output signal and has no output signal. When terminal 30 has an output signal, terminal 32 does not, and when terminal 32 has an output signal, terminal 30 has not. It can be seen that either of the output terminals 30 or 32 may be selected to provide an output signal which is representative of the least significant digit of a binary number.

The number of segments 12 is governed by the highest number it is desired to represent in the binary code. For example, if a total of sixteen numbers, as from 0 to 15, are to be represented, eight segments 12 should be provided. This follows from the fact that sixteen changes from a "0" to a "1" and back again are required to represent this many numbers in the binary code. For purposes of convenience, I have shown the form of my device illustrated in Figure 1 as representing the numbers from 0 to 15. It will be appreciated that the numbers represented can be increased by increasing the number of segments 12 as well as the number of rows of segments, as will be explained hereinafter.

I have provided a second circle of segments, indicated generally by the reference character 48. Alternate segments 50 of the circle 48 are connected by respective conductors 52 to a first slip ring 54 of a pair of slip rings 54 and 56 associated with the row 48. The remaining segments 58 of row 48 are connected by respective conductors 60 to the slip ring 56. The length $l_2$ of the segments 50 and 58 of the circle 48 is approximately twice the length $l_1$ of the segments 12 of the circle 10. Length $l_2$ is, however, slightly less than twice the length $l_1$ in order to provide some clearance between adjacent segments 50 and 58 to prevent short circuiting of adjacent segments. It will be understood that $l_2$ is still smaller than twice $l_1$ because the circumference of circle 48 is less than that of circle 10. Similarly, all lengths referred to hereafter are obviously arc lengths subtended over given central angles of the disk for a particular radius. For ease of description I have shown the segments of circle 10 to be radially aligned with those of circle 48. In Figure 1 a radius of the disk appears as a vertical line.

In order to provide a means for conducting the output signals from the first circle 10 to the segments 50 and 58 of circle 48, I provide a pair of brushes 62 and 64 to engage the segments of circle 48. Line 20 is connected to brush 62 by a crystal or other unidirectional conducting device 66. A crystal or the like 68 connects line 18 with brush 64. The brushes 62 and 64 are symmetrically disposed with respect to a vertical line drawn through brush 28 and are relatively spaced by a distance $n_1$ which is equal to the length $l_1$ of a segment 12 of row 10. When one of the conductors 18 or 20 carries a signal, this signal will be applied through one of crystals 68 or 66 by associated brush 64 or 62 to that segment of circle 48 which the brush engages.

Respective brushes 70 and 72 connect slip rings 54 and 56 to output conductors 74 and 76 of the second circle 48. Conductors 74 and 76 are connected by respective loading resistors 78 and 80 to ground and are provided with respective output terminals 82 and 84. If a brush 62 or 64 carrying a signal were to engage a segment 50 connected to slip ring 54, the output signal would appear at terminal 82 by reason of the connection between conductor 74 and slip ring 54 provided by brush 70. Similarly, if a brush 62 or 64 carrying a signal were to engage a segment 58 connected to slip ring 56, the signal would appear at terminal 84 by reason of the connection between conductor 76 and slip ring 56 by brush 72. If both brushes 62 and 64 were to engage the same segment 50 or 58, the blocking crystal 66 or 68, connected to the brush which does not carry the signal, prevents feeding the signal back to an otherwise unenergized output line 18 or 20 of the first circle. As will be explained hereinafter, only that brush 62 or 64 which is best centered on a segment 50 or 58 receives a signal from the output conductors 18 and 20 of the first row. One of the terminals 82 or 84 is selected to provide the next to least significant digit of the binary number, as will be explained hereinafter.

I provide a third circle of segments, indicated generally by the reference character 86. Alternate segments 88 of circle 86 are connected by respective conductors 90 to a first slip ring 92 of a pair of slip rings associated with the circle 86. The remaining segments 96 of the circle 86 are connected by respective conductors 98 to the second slip ring 94. The length $l_3$ of each of the segments 88 and 96 of the row 86 is approximately twice the length $l_2$ of the segments 50 and 58 of circle 48. Sufficient space, however, is left between adjacent segments 88 and 96 to prevent the short circuiting of the adjacent segments. To apply the output signals from the conductors 74 and 76 of the second circle 48 to the segments 88 and 96 of the third circle 86, I provide a pair of brushes 100 and 102 disposed to engage segments 88 and 96 as they move relative to the brushes. The spacing $n_2$ between the brushes 100 and 102 is twice the spacing $n_1$ between brushes 62 and 64 and is approximately equal to the length $l_2$ of segments 50 and 58. It is apparent that for the particular orientation of crystals 66 and 68 shown, the signal input voltage applied at terminal 26 must be a positive D. C. or a series of positive going pulses. If the orientation of crystals 66 and 68 were reversed, the signal input at terminal 26 would have to be a negative D. C. or a negative going series of pulses. Brush 70 is connected to brush 100 through a crystal 104 or the like, while brush 72 is connected through a crystal 106 to brush 102. It will be appreciated that if slip ring 54 with which brush 70 is associated carries a signal, brush 100 will apply this signal to the segment 88 or 96 which it engages. Similarly, if slip ring 56 with which brush 72 is associated carries a signal, brush 102 will apply this signal to the segment 88 or 96 which it engages. Blocking crystals 104 and 106 prevent signals from being fed back to an otherwise unenergized output line 74 or 76 of the second circle when both brushes 100 and 102 engage the same segment 88 or 96. The respective slip rings 92 and 94 are connected by brushes 108 and 110 to the output conductors 112 and 114 of the circle 86. Conductors 112 and 114 are connected to ground by respective loading resistors 116 and 118 and are provided with respective output terminals 120 and 122. As will be explained more fully hereinafter, one or the other of the terminals 120 and 122 always has an output signal, while both terminals never have an output signal at the same time. The output signal from one of the terminals 120 or 122 is selected to provide a representation of the third least significant figure of the binary number.

I provide a fourth circle or row of segments, indicated generally by the reference character 124. One of these segments 126 is connected by a conductor 128 to a first slip ring 130 of a pair of slip rings 130 and 132 associated with circle or row 124. The other segment 134 of circle 124 is connected by a conductor 136 to slip ring 132. The length $l_4$ of the segments 126 and 134 of the circle 124 is approximately twice the length $l_3$ of segments 88 and 96 of circle 86. Sufficient space, however, is left between the segments to prevent short circuiting thereof. To apply the output signals from circle 86 to the segments of circle 124, I provide a pair of brushes 138 and 140 disposed to engage segments 126 and 134 as they move relative to the brushes. A crystal 142 connects brush 138 with brush 108. A second crystal 144 connects brush 140 with brush 110. The spacing $n_3$ between brushes 138 and 140 is substantially twice the spacing $n_2$ between brushes 100 and 102 and is approximately equal to the length $l_3$ of the segments 88 and 96. It will be appreciated that when slip ring 92 carries a signal, brush 138 will apply this signal to the segment 126 or 134 which it contacts. Similarly, if slip ring 94 carries a signal, brush 140 applies this signal to the segment 126 or 134 which it contacts. Crystals 142 and 144 prevent feeding of the signals back to output lines 112 or 114 when both brushes engage the same segment. The slip rings 130 and 132 associated with circle 124 are connected by respective brushes 146 and 148 to the output conductors 150 and 152 of circle or row 124. The respective conductors 150 and 152 are connected to ground through resistors 154 and 156 and are provided with respective output terminals 158 and 160. As will be explained in detail hereinafter, one of the terminals 158 or 160 is selected to provide the most significant digit of the binary number in the arrangement shown.

It is to be noted that loading resistors 78, 80, 116, 118, 154, and 156 and summing resistor 46 have a low value with respect to the back resistance of the blocking crystals, such as 104 and 106, in the brush circuits. Thus they ensure the return of the associated slip rings and output terminals to ground to represent a "0" when no signal is applied even though the back resistance of the blocking crystals is not infinite.

From the foregoing description it can be seen that the length of the individual segments is approximately doubled from row to row of my device. In all rows after the first row 10, the number of segments decrease by half from row to row. The spacing between input brushes of successive rows is doubled from row to row beginning with the input brushes 62 and 64 of the second row, which are spaced a distance equal to the length of a segment 12 of the first row 10. All brushes are electrically symmetrically disposed with relation to a vertical line passing through the input brush 28. Moreover, as will be explained in detail hereinafter, the segments of all rows are electrically aligned with respect to a zero position.

It may readily be demonstrated that this arrangement products a digital representation in the natural binary code of a movable member with respect to a stationary member. Assuming for purposes of convenience that all the movable segments move relative to the connecting brushes in the direction of the arrow A in Figure 1, brush 28 alternately is positioned to engage a segment 12 or is disposed between a pair of adjacent segments. Conveniently, the successive relative positions of brush 28 with respect to the segments 12 are represented by reference characters $x_0$ to $x_{15}$. The corresponding successive positions of brush 62 have been indicated by $a_0$ to $a_{15}$. The successive positions of brush 64 are represented by $b_0$ to $b_{15}$. The successive positions of brush 102 are represented by $c_0$ to $c_{15}$. The successive positions of brush 100 are represented by $d_0$ to $d_{15}$. The successive positions of brush 140 are represented by $e_0$ to $e_{15}$, and the successive positions of brush 138 are represented by $f_0$ to $f_{15}$. Let us assume that all brushes are in a position represented by the corresponding letters with the subscript "0." At this time, the input signal to terminal 26 which may be a positive D. C. or a positive going series of pulses is applied to a segment 12 by brush 28, so that terminal 30 has an output signal which represents a "1" in the binary code. As explained hereinabove, when terminal 30 has an output signal, terminal 32 has no output signal, so that a "0" is represented at this terminal. In the position $a_0$, brush 62 may engage a segment 58 or 50, or it may be disposed between adjacent segments 58 or 50. It will be appreciated that if brush 62 were to transfer a signal in the $a_0$ position, a possible ambiguity would be introduced into the system. However, since conductor 20 to which brush 62 is connected has no output signal at this time, brush 62 is not required to transfer a signal and the possibility of an ambiguity is overcome. In the $b_0$ position, brush 64 engages a segment 50. Since line 18 to which brush 64 is connected carries the input signal, brush 64 transfers this signal to the segment 50 which it contacts. The interval $b_0$ in which brush 64 is disposed at this relative position of the movable segments with respect to the brushes is equal to one half the length of a segment 50 and is symmetrical about the center of the segment. Consequently, a permissible misalignment of brush 64 with respect to the segments 50 of $\pm\frac{1}{4}l_2$ is permissible before any ambiguity will be introduced by brush 64. The signal applied by brush 64 to segment 50 is conducted to slip ring 54 by conductor 52 so that terminal 82, which is connected to slip ring 54 by brush 70, and conductor 74 have an output signal which represents a "1." At the same time, slip ring 56 has no signal applied thereto whereby a "0" is represented at terminal 84.

In the $e_0$ position, brush 140 is disposed in an interval 96 or is disposed between adjacent segments 96 and 88. If it were to transfer a signal, a possible ambiguity would result. Since, however, line 76 carries no signal, brush 102 is not required to conduct a signal and the possibility of an ambiguity is eliminated. In the $d_0$ position, brush 100 engages a segment 88. The signal appearing on line 74 is conducted to segment 88 by brush 100. As will be explained hereinafter, each of the brushes 100 and 102 is to transfer a signal only when it is within an interval of a length equal to half a segment length symmetrical about the center of a segment. Consequently, a permissible misalignment of a brush with respect to a segment of approximately ±¼ the length of a segment is permissible. The signal impressed by brush 100 on segment 88 is conducted to the output terminal 120 to represent a "1." Since no signal is impressed on the segments 96, "0" is represented at terminal 122.

In the $e_0$ position, brush 140 is disposed in an interval which is further than a quarter segment length of segment 134 from the center of segment 134. Since line 114 carries no signal, brush 140 will transfer no signal to segment 134 so that a "0" is represented at terminal 160. In the $f_0$ position, brush 138 is disposed in an interval which is within one quarter of a segment length of segment 126 from the center of segment 126. In this position, brush 138 transfers the signal on line 112 to segment 126 so that an output signal representing a "1" appears at terminal 158. Brushes 138 and 140 are only required to transfer signals when within one quarter of a segment length of the center of either segment 134 or 126. Consequently, a tolerance of $\pm\frac{1}{4}l_4$ is permissible in row 124.

From the foregoing, it can be seen that in the positions represented by the corresponding letters with subscript 0, the terminals 30, 82, 120, and 158 have outputs representing "1's" in the binary code, while terminals 32, 84, 122, and 160 have no outputs, so that "0's" are represented at these terminals. The outputs at the terminals 30, 82, 120, and 158 provide a binary representation of the number 15, while the outputs at terminals 32, 84, 122, and 160 represent zero. Conveniently, for the direction of rotation shown I select terminals 32, 84, 122, and 160 to provide the binary representation. The remaining terminals provide a representation of the complement of this number.

As the segments move with respect to the brushes so that the brushes occupy the relative positions indicated between corresponding letters with the subscript 1, an output signal appears at terminal 32 while no outputs appear at terminals 84, 122, and 160. The result is a binary representation of the number 1. In the positions of the brushes represented by the corresponding letters with the subscript 12, outputs appear at terminals 122 and 160 to represent "1's" while no output appears at terminals 32 and 84. The result is a binary representation of the number 12. That is, terminal 160 provides the most significant digit of the binary number, terminal 122 provides the next most significant digit of the binary number, terminal 84 provides the next to least significant digit of the binary number, and terminal 32 provides the least significant digit of the binary number. For purposes of convenience, I have shown the representations at the respective terminals corresponding to the positions occupied by the brushes in the following Table I:

*Table I*

| Input brush position | Terminals | | | | | | | | Binary number | Decimal number |
|---|---|---|---|---|---|---|---|---|---|---|
| | 160 | 158 | 122 | 120 | 84 | 82 | 32 | 30 | Output 160, 122, 84, 32 | |
| $x_0$ | 0 | 1 | 0 | 1 | 0 | 1 | 0 | 1 | 0000 | 0 |
| $x_1$ | 0 | 1 | 0 | 1 | 0 | 1 | 1 | 0 | 0001 | 1 |
| $x_2$ | 0 | 1 | 0 | 1 | 1 | 0 | 0 | 1 | 0010 | 2 |
| $x_3$ | 0 | 1 | 0 | 1 | 1 | 0 | 1 | 0 | 0011 | 3 |
| $x_4$ | 0 | 1 | 1 | 0 | 0 | 1 | 0 | 1 | 0100 | 4 |
| $x_5$ | 0 | 1 | 1 | 0 | 0 | 1 | 1 | 0 | 0101 | 5 |
| $x_6$ | 0 | 1 | 1 | 0 | 1 | 0 | 0 | 1 | 0110 | 6 |
| $x_7$ | 0 | 1 | 1 | 0 | 1 | 0 | 1 | 0 | 0111 | 7 |
| $x_8$ | 1 | 0 | 0 | 1 | 0 | 1 | 0 | 1 | 1000 | 8 |
| $x_9$ | 1 | 0 | 0 | 1 | 0 | 1 | 1 | 0 | 1001 | 9 |
| $x_{10}$ | 1 | 0 | 0 | 1 | 1 | 0 | 0 | 1 | 1010 | 10 |
| $x_{11}$ | 1 | 0 | 0 | 1 | 1 | 0 | 1 | 0 | 1011 | 11 |
| $x_{12}$ | 1 | 0 | 1 | 0 | 0 | 1 | 0 | 1 | 1100 | 12 |
| $x_{13}$ | 1 | 0 | 1 | 0 | 0 | 1 | 1 | 0 | 1101 | 13 |
| $x_{14}$ | 1 | 0 | 1 | 0 | 1 | 0 | 0 | 1 | 1110 | 14 |
| $x_{15}$ | 1 | 0 | 1 | 0 | 1 | 0 | 1 | 0 | 1111 | 15 |

I have selected the representation provided at terminals 32, 84, 122, and 160 to provide the digital representation indicated in Table I. For example, these terminals may be connected to visual indicating devices, such as neon glow tubes, so that output signals therefrom may trigger the indicators to provide a visual indication of the binary number represented. It is to be understood the binary output may be employed in any appropriate manner, as for example, the input to a suitable binary system computor. With only four rows of segments and eight segments in the first row, the highest possible number which can be represented is 15. If it is desired to represent a higher number in the binary system, additional rows of segments are provided and the number of segments in the first row is increased correspondingly. As explained hereinabove, the number of segments in succeeding rows after the second row decreases by a factor of two from row to row, while the length of the individual segments doubles from the first row throughout succeeding rows. The segments of all rows are electrically aligned about a vertical line separating the $x_{15}$ position from the $x_0$ position. The brushes of the respective pairs of brushes connecting successive rows are symmetrically disposed with respect to a vertical line passing through the input brush. The separation between the brushes of a pair is approximately equal to the length of the segment of a preceding row.

Figure 3:
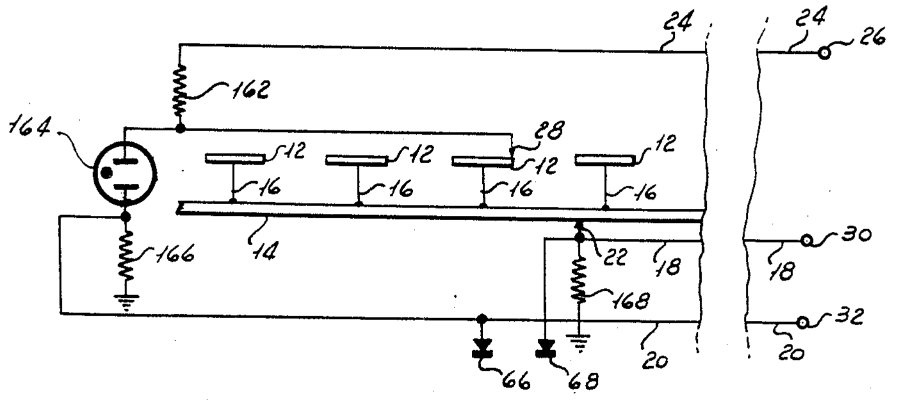
Figure 3 is a fragmentary developed schematic view of the form of my analogue-to-digital converter shown in Figure 1 showing different logic circuitry for obtaining the secondary output for the outermost circle of segments.

Referring now to Figure 3, in which I have provided alternate auxiliary logic circuitry for insuring that output conductor 20 of terminal 32 has an output signal of "1" when conductor 18 has no signal and rests at ground, representing a "0," like parts to those shown in Figure 1 are indicated by like reference numerals. I connect input line 24 to brush 28 by an input resistor 162. Brush 28 is also connected to one terminal of a voltage regulating tube 164 which may be a simple neon glow tube. The second terminal of tube 164 is connected to ground by a loading resistor 166. Output line 20 is connected to the junction of loading resistor 166 and the second terminal of tube 164. Output line 18 is connected to ground by voltage dividing resistor 168. An output terminal at ground potential represents a "0." An output terminal with signal voltage impressed thereon represents a "1." This output voltage must be more than sufficient to operate external terminal devices not shown. In operation of this embodiment of my invention, assume, for example, that the external terminal devices will just operate at an output voltage of 25 volts. To insure that these devices will surely operate I then make the output signal representing a "1" equal to 50 volts. I may choose the resistance value of loading resistor 166, whose action is the same as loading resistors 78, 80, 116, 118, 154 and 156, to be equal to the resistance value of these resistors. I will then choose the value of input resistor 162 to be equal to that of voltage dividing resistor 168, and to be much smaller than that of loading resistor 166. I then employ an input signal voltage of 100 volts, and use a voltage regulating tube 164 which has a 50 volt drop. When input brush 28 lies between segments 12, the 100 volt input on line 24 appears as a 50 volt output on line 20 because of the 50 volt drop across tube 164. Actually the output on line 20 will be slightly less than 50 volts because of a small voltage drop across input resistor 162. Output line 18 will be at ground potential by virtue of the connection to ground afforded by voltage dividing resistor 168. When input brush 28 engages a segment 12, the 100 volt input is shared equally across input resistor 162 and voltage dividing resistor 168. Hence the output on line 18 and the potential of brush 28 are now 50 volts. Since a 50 volt drop exists across tube 164, output line 20 is now at ground potential.

Figure 2:
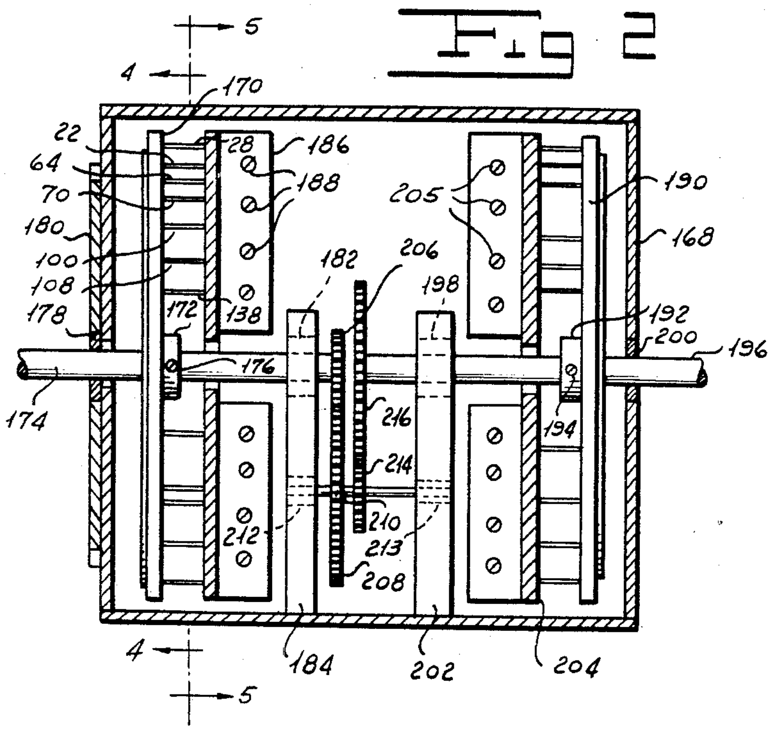
Figure 2 is a sectional elevation of the analogue-to-digital converter shown in Figure 1.
Figure 4:
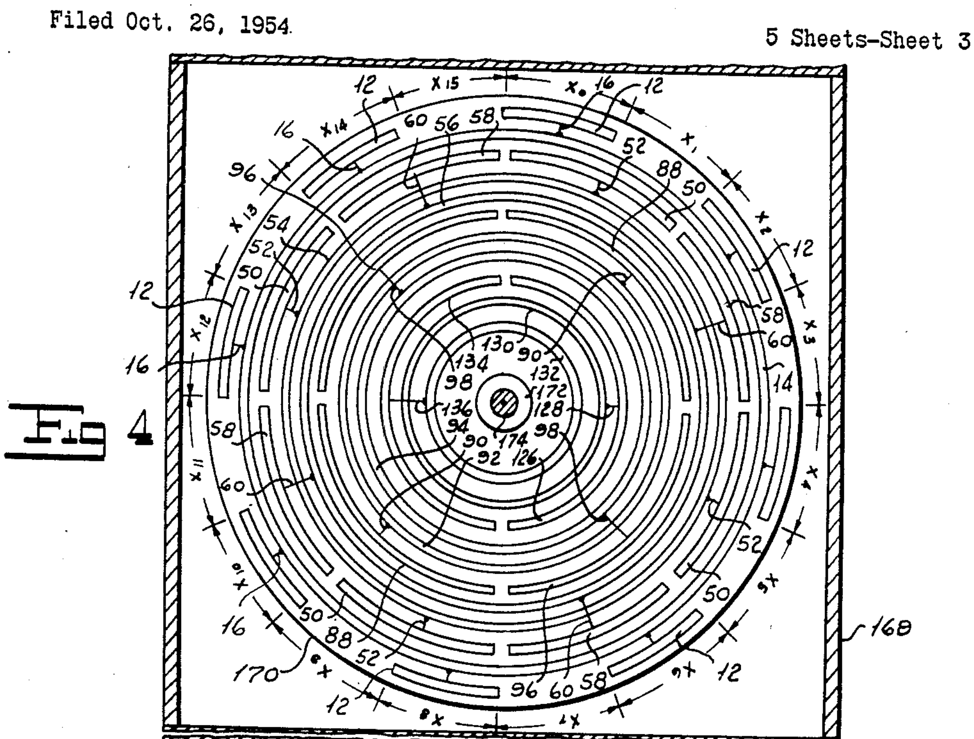
Figure 4 is a sectional view of my analogue-to-digital converter, drawn on an enlarged scale, taken along the line 4—4 of Figure 2 and showing the arrangement of the conducting segments on a disk of this form of my invention.
Figure 5:
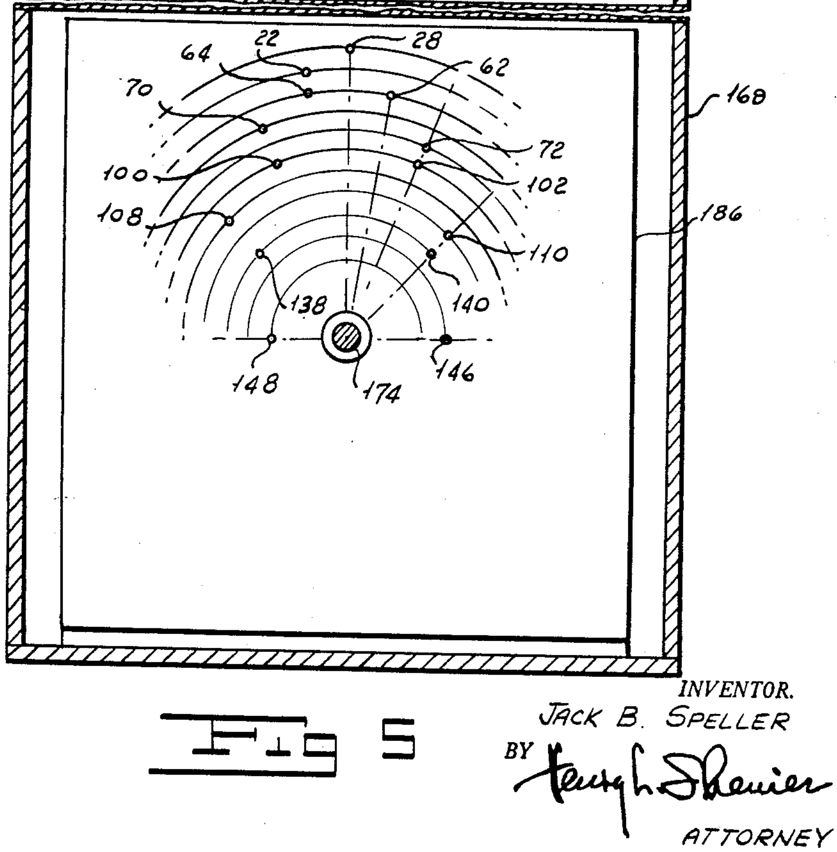
Figure 5 is a sectional view of my analogue-to-digital converter drawn on an enlarged scale, taken along the line 5—5 of Figure 2 showing the arrangement of brushes which cooperate with the segments shown in Figure 4.
Figure 5:
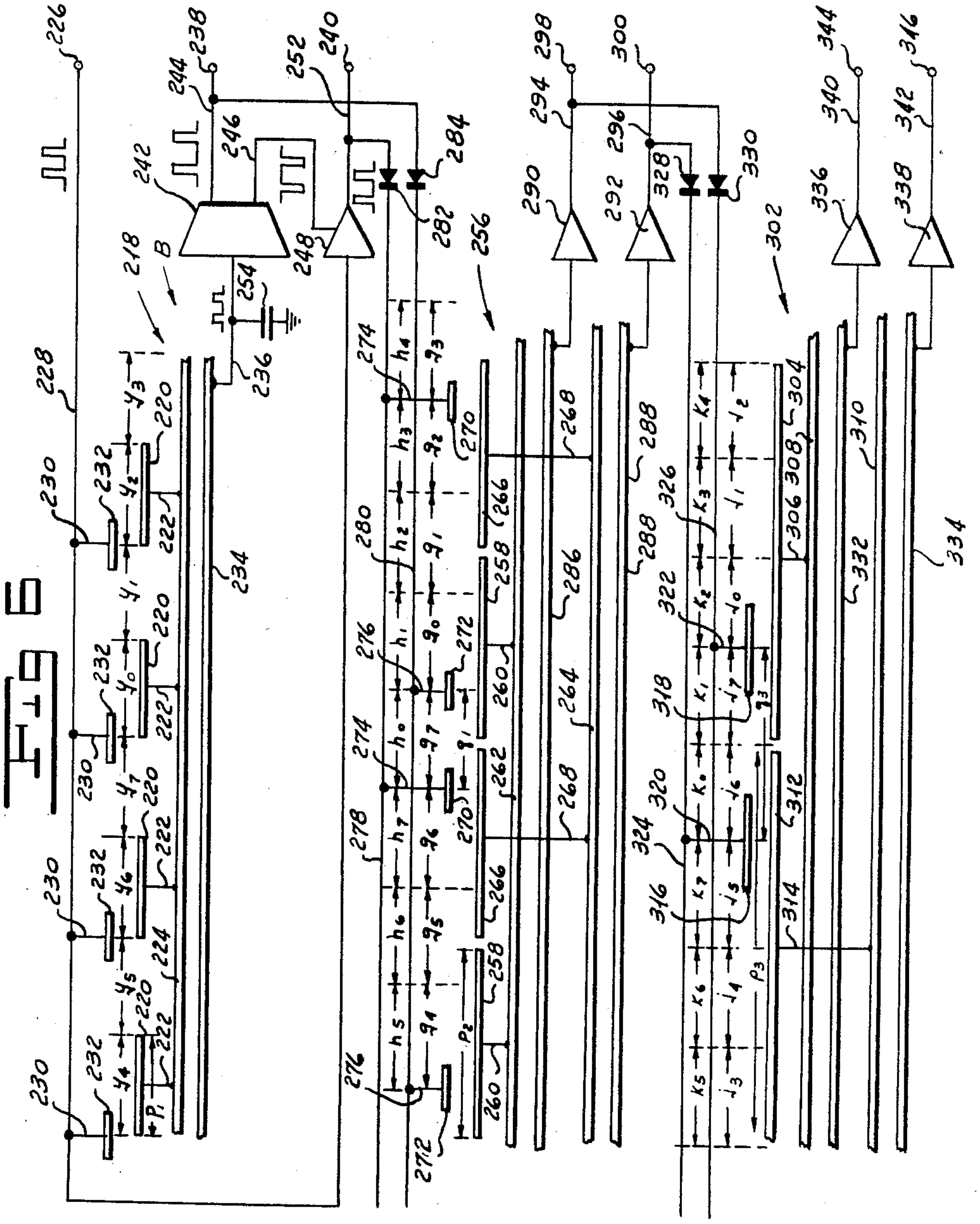

Referring now to Figures 2, 4 and 5, I have shown a specific embodiment of my converter. Conveniently I have shown a rotary form of my device which provides a representation in the natural binary code of the angular position of a shaft. It will readily be appreciated that the form may be made linear to represent the position of one reciprocating member with respect to another. The two speed form of my invention shown in Figure 2 includes two sections connected mechanically by speed reduction gearing. A suitable housing 168 houses both sections of the device. The first, or high speed, section of the device includes a high speed disk 170 formed with a hub 172 which is fixed on a shaft 174 by means of a set screw 176. This high speed shaft 174 is rotatably supported in a first bearing 178 carried by a plate 180 secured by any convenient means to the housing 168. A second bearing 182 carried by a support 184 mounted in the housing 168 also supports shaft 174. Disk 170 carries the rows of movable segments of my device. A brush mounting member 186, supported in housing 168, adjustably positions the brushes which are to cooperate with the segments on the disk 170. Conveniently the brushes may be adjustably mounted on member 186 by screws 188. The second, or low speed, section of the form of my device shown in Figure 2 includes a low speed disk 190 formed with a hub 192. A set screw 194 mounts hub 192 on an input shaft 196. Input shaft 196 is rotatably mounted in bearings 198 and 200 carried respectively by a support 202 in housing 168 and by the side of housing 168. Disk 190 carries the segments of the second section of this form of my device. A brush mounting member 204 carried by housing 168 adjustably positions the brushes which are to cooperate with the segments on disk 190. Screws 205 are provided for this purpose.

The speed reduction between high speed shaft 174 and low speed input shaft 196 is accomplished by two pairs of intermeshing gears. A pinion 206 fixed to shaft 174 meshes with gear 208 which is fixed on an intermediate shaft 210. This shaft 210 is journaled in bearings 212 and 213 carried by supports 184 and 202 respectively. A second pinion 214, fixed to intermediate shaft 210, meshes with a second gear 216 fixed to shaft 196. The overall speed reduction between shafts 174 and 196 is equal to the maximum count of low speed disk 190. For example, if disk 190 has a maximum count of 8, the overall speed reduction will be 8 to 1.

Figure 4 shows the arrangement of the segments and slip rings of Figure 1 on high speed disk 170. Figure 5 shows the arrangement of the stationary brushes of Figure 1 on brush mounting 186. Disks 170 and 190 may be formed of some insulating material such as glass, synthetic resin or the like and the appropriate conducting segments and slip rings may be photographically printed on the surface of the disks with conducting material such as copper, silver or the like. The arrangement of segments and brushes shown in Figures 4 and 5 corresponds to the arrangement set forth in Figure 1 and the like parts are indicated by like reference numerals. The positions for various representations are indicated by the characters $x_0$ to $x_{15}$ as was done in connection with Figure 1. While I have shown only one pair of brushes associated with each row of segments, it will readily be appreciated that other brushes correspondingly placed opposite electrically similar segments could be employed to increase the current carrying capacity. For example, other pairs of brushes 62 and 64 could be employed in connection with row 48. These pairs of brushes would contact other segments 50 in the manner shown for brushes 62 and 64 in Figure 1. Of course, only one pair of brushes 138 and 140 could be used in row 124 since there are only two segments 126 and 134 in that row. As many input brushes 28 as there are segments 12 could also be employed, as all segments 12 are electrically similar.

Low speed disk 190 is somewhat different from high speed disk 170 in that the first row 10 composed of segments 12 and slip ring 14 is omitted. Consequently the first row of low speed disk 190 will be as row 48 of high speed disk 170. Except for this omission the two disks may be identical. The reason for this omission is that the first row 10 of high speed disk 170 supplies the least significant digit of the binary number which represents the position of input shaft 196, while the outermost circle or first row of the low speed disk 190 provides a digit of only intermediate significance in the binary number which represents the position of shaft 196. For the low speed section, input brush 28 and output brush 22 of row 10 are not provided on brush mounting member 204, because of the omission of row 10. The two sections are also electrically connected. Output brush 148 of the high speed section is connected to a low speed input brush 62 through a low speed blocking crystal 66. High speed output brush 146 is connected to a low speed input brush 64 through a low speed blocking crystal 68. No auxiliary logic circuitry is here employed and none is required for the first row of low speed disk 190. The maximum count of the low speed disk will be 8. The overall maximum count of both sections combined will be $8\times16=128$; and, because I have selected the lengths of all segments 12 and the lengths of all spaces between the segments 12 to be equal, the digital representation will be a linear function of shaft position.

Figure 8:
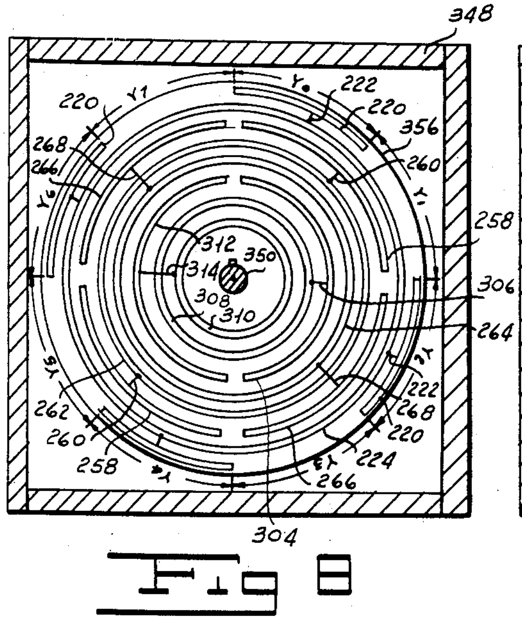
Figure 8 is a sectional view of my analogue-to-digital converter drawn on an enlarged scale taken along the line 8—8 of Figure 7 and showing the arrangement of segments on a disk of this embodiment of my invention.
Figure 9:
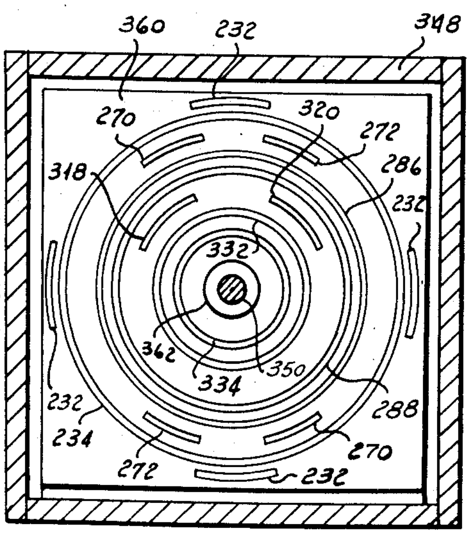
Figure 9 is a sectional view drawn on an enlarged scale taken along the line 9—9 of Figure 7 showing the arrangement of the coupling segments which cooperate with the segments shown in Figure 8.

The capacitively coupled form of my invention illustrated in Figures 6, 8, and 9 includes a first row indicated generally by the reference character 218 of movable conducting segments 220. Segments 220 are connected by respective conductors 222 to a movable capacitor slip ring 224. An input terminal 226 to which an appropriate input such as a series of positive going pulses is applied is connected by a conductor 228 and respective conductors 230 to a number of stationary input coupling segments 232. Each of the segments 220 is of a predetermined length $p_1$. The inter-segment space between the segments 220 is equal to the length $p_1$. The length of the stationary input coupling segments 232 which are to cooperate with segments 220 is shown in Figures 6 and 9 to be half the length $p_1$. When segments 232 and 220 are opposite one another, the input signal at terminal 226 is coupled to capacitive slip ring 224 by the capacitive coupling between coupling segments 232 and conducting segments 220. When, however, coupling segments 232 are in positions where they are not disposed opposite segments 220, but are opposite an inter-segment space, the input signal is not coupled to capacitive slip ring 224. I provide a stationary capacitive slip ring 234 which cooperates with slip ring 224 to capacitively couple an output conductor 236 with slip ring 224. The capacitance between slip rings 224 and 234 is much larger than the capacitance between input coupling segments 232 and segments 220 when fully opposed. Associated with the first row 218 is a pair of output terminals 238 and 240. I provide auxiliary logic circuitry for insuring that terminal 238 has an output signal representing a "1" in the binary code when segments 232 and 220 are opposed, and also to insure that terminal 240 has an output signal representing a "1" when segments 232 and 220 are not aligned. The arrangement is such that a substantially instantaneous transfer of the output signal from a terminal 240 to terminal 238 or vice versa results when the center lines of coupling segments 232 register with either of the ends of segments 220 as segments 220 move with respect to coupling segments 232. I connect conductor 236 to the input of a trigger circuit such as bistable flip-flop 242. As is well known in the art, an input signal such as a series of positive going pulses to flip-flop 242 results in two output signals, one being a positive going series of pulses, and the second being a negative going series of pulses. I connect the positive pulse output of trigger circuit 242 to output terminal 238 by means of a conductor 244. The negative pulse output of trigger circuit 242 is connected by a conductor 246 to the gate input of normally operative gated amplifier 248, which may consist of a pentode followed by an inverting stage. The negative gating pulses, which may be applied either to the suppressor or screen grid of the pentode, render gated amplifier 248 inoperative. Input line 228 is connected to the control grid of the pentode of amplifier 248. The output of amplifier 248 is connected by a conductor 252 to output terminal 240.

I connect a loading capacitor 254 from conductor 236 to ground. This capacitor 254 has a capacitance which is of the same order of magnitude as the capacitance between segments 232 and 220, when fully opposed. The capacitance between input segments 232 and segments 220 and the capacitance of capacitor 254 form a capacitive voltage divider for the input signal to make the input voltage on line 236 to flip-flop 242 more linear with changes in the former capacitance due to movement of segments 220 past input segments 232.

When the segments 232 are aligned with an inter-segment space between segments 220, no signal is coupled to slip ring 234 so that the flip-flop circuit 242 produces no output signals. At this time, however, the input signal on line 228 applied to the control input of gated amplifier 248 causes a positive output pulse on line 252 which is conducted to terminal 240 to represent a "1." My auxiliary logic circuitry insures that when sufficient capacitive coupling exists between segments 232 and 220 to cause a sufficient signal to appear on line 236 to operate trigger circuit 242, terminal 240 will have no signal so that a "0" is represented thereat. If there is sufficient coupling to operate flip-flop 242, a positive output pulse is produced at terminal 238 to represent a "1." At the same time, however, the negative output pulse from the flip-flop circuit 242 passes through conductor 246 to the gate input of amplifier 248. This negative pulse cuts off amplifier 248 so that the amplifier is no longer responsive to the control input on line 228. Consequently, a "0" is represented at terminal 240. From the foregoing, it will be apparent that one or the other of the conductors 244 and 252 always carries a signal, but conductors 244 and 252 never carry signals at the same time. I select one of the terminals 238 or 240 to provide the least significant figure of the binary number. At each of these terminals, a "1" and a "0" alternately are represented as segments 232 register with segments 220 and an inter-segment space. It is apparent that the change in representation at either terminal is substantially instantaneous and may be made to occur as the center lines of segments 232 register with the leading edges of or the trailing edges of segments 220 by adjusting either the magnitude of the input pulses to terminal 226, the capacitance of capacitor 254, or the required operating voltage of trigger circuit 242. The length of coupling segments 232 is not critical, and could be made equal to segments 220.

I provide a second row indicated generally by the reference character 256 of movable segments. Alternate segments 258 of the row 256 are connected by respective conductors 260 to a first slip ring 262 of a pair of movable capacitor rings 262 and 264 associated with row 256. The remaining segments 266 of row 256 are connected by respective conductors 268 to the capacitor ring 264. To couple output signals from conductors 244 and 252 to the movable segments of row 256, I provide a first pair of stationary input coupling segments 270 and 272 connected respectively by conductors 274 and 276 to conductors 278 and 280. Conductors 278 and 280 are connected by respective uni-directional conducting devices such as crystals 282 and 284 to conductors 252 and 244. The segments 270 and 272 form capacitors with the segments 258 and 266 with which they register to couple signals from lines 278 and 280 to capacitor rings 262 and 264. In order to increase the capacitive coupling, I employ as many stationary segments 270 and 272 as is possible. As has been explained hereinabove, the length $p_2$ of the individual segments 258 and 266 is selected to be approximately twice the length $p_1$ of the segments 220. Sufficient space must be left, however, between the segments 258 and 266 to prevent the short circuiting of adjacent segments. The length of segments 270 and 272 is shown to be approximately one-quarter the length $p_2$ of the segments 258 and 266. As has also been explained hereinabove, the distance $q_1$ between the centers of coupling segments 270 and 272 of a particular pair is selected to be equal to the length $p_1$ of a segment 220. The centers of respective segments 270 and 272 are symmetrically disposed with respect to a vertical line passing through the center of one of the stationary input segments 232 of the first row. If conductor 244 carries a signal, this signal is coupled by segments 272 to the segments 258 or 266 with which they are aligned. Similarly, if conductor 252 carries a signal, this signal is coupled by segments 270 to the segments 258 or 266 with which they are aligned. The arrangement is such, as will appear hereinafter, that neither of the segments 270 or 272 is required to couple a signal when their center lines are more than a quarter segment length of a segment 258 or 266 distant from the center line of a segment 258 or 266. This arrangement permits a misalignment between segments 270 or 272 and segments 258 or 266 to which they couple a signal. Blocking crystal 282 conducts the signal on line 252 to line 278; and, blocking crystal 284 conducts the signal on line 244 to line 280. These crystals prevent feedback of a signal to an output terminal 238 or 240 of the first row 218 when both segments 270 and 272 are disposed opposite the same segments 258 or 266.

I provide respective stationary capacitive slip rings 286 and 288 for capacitively coupling the respective slip rings 262 and 264 to output amplifiers 290 and 292. Amplifiers 290 and 292 may be simple cathode followers so that the positive input pulses are duplicated at the outputs of the amplifiers. Respective amplifier output conductors 294 and 296 are connected to output terminals 298 and 300. The logic is such that one or the other of conductors 294 and 296 always has an output signal representing a "1," while at no time do both conductors 294 and 296 carry a signal. As a consequence, a "1" is always represented at one of the terminals 298 or 300 while a "0" is represented at the other of the terminals. I select one of the terminals 298 or 300 to provide the second significant digit of the binary number.

I provide a third row indicated generally by the reference character 302 of relatively movable segments. One segment 304 of row 302 is connected by a conductor 306 to a first capacitive slip ring 308 of a pair of movable capacitive slip rings 308 and 310 associated with row 302. The other segment 312 of row 302 is connected by a conductor 314 to the movable capacitive slip ring 310. The length $p_3$ of each of the segments 304 and 312 is approximately twice the length $p_2$ of a segment 258 or 266 of row 256. Sufficient space is left between segments 304 and 312 to prevent the short circuiting thereof. To couple signals appearing on conductors 294 and 296 to the segments 304 and 312, I provide a pair of stationary coupling segments 316 and 318 connected by respective conductors 320 and 322 to conductors 324 and 326. The respective conductors 324 and 326 are connected by blocking crystals 328 and 330 to conductors 296 and 294. The length of stationary coupling segments 316 and 318 is shown to be one-quarter the length of $p_3$. The distance $q_3$ between centers of the segments 316 and 318 is approximately equal to the length $p_2$ of segments 258 and 266. If conductor 294 carries a signal, this signal is coupled by segment 318 to the segment 304 or 312 with which it registers. If conductor 296 carries a signal, this signal is coupled by segment 316 to the segment 304 or 312 with which it registers. The arrangement is such that segments 316 and 318 are not required to couple signals when their center lines are more than a quarter segment length of segments 304 and 312 distant from the center line of segment 304 or 312. This arrangement permits a misalignment between a coupling segment 316 or 318 and the segment 304 or 312 with which it should register. Blocking crystals 328 and 330 prevent feedback of a signal to an output terminal 298 or 300 of the preceding row 256 when both segments 316 and 318 are aligned or register with the same segment 304 or 312. I provide respective stationary capacitive slip rings 332 and 334 for capacitively coupling slip rings 308 and 310 to respective output amplifiers 336 and 338. Amplifiers 336 and 338 may be simple cathode followers to prevent inversion of the positive pulses. Amplifiers 336 and 338 are connected by respective conductors 340 and 342 to output terminals 344 and 346. The logic is such that one of the terminals 344 or 346 always carries an output signal but at no time do both terminals carry output signals. Consequently a "1" is represented at one of the terminals while a "0" is represented at the other of the terminals. I select one of the terminals 344 or 346 to provide the most significant figure of the binary number.

It is obvious that the capacitively coupled form of my invention could be operated by a series of negative pulses as well. To accomplish this the following changes may be made. The internal input circuitry (not shown) of trigger circuit 242 would be altered so as to make trigger circuit 242 responsive to negative going pulses of sufficient magnitude. In such a case only a negative going output is required from trigger circuit 242; and this output would be connected to output terminal 238. Gated amplifier 248 would then consist of an inverting stage followed by a pentode stage. The negative input pulses on line 228 would be applied to the input grid of the inverting stage. The positive otuput pulses of the inverting stage would be applied to the control grid of the pentode. The negative going output pulses of trigger circuit 242 which appear at output terminal 238 are applied as gating pulses to either the screen or the suppressor grid of the pentode. The output of the pentode stage would be connected to output terminal 240. When the magnitude of the negative pulses on line 236 to the input of trigger circuit 242 is insufficient for operation thereof, no negative pulses will appear at output terminal 238, and no negative gating pulses will be applied to gated amplifier 248. Consequently gated amplifier 248 is operative and the negative input pulses on line 228 appear as negative pulses at output terminal 240. When the magnitude of the negative pulses on line 236 to the input of trigger circuit 242 is sufficient for operation thereof, negative pulses will appear at output terminal 238, and negative gating pulses will be applied to gated amplifier 248. This amplifier will be rendered inoperative and no pulses will appear at output terminal 240. The polarity of crystals 282, 284, 328 and 330 will be reversed so that they will be responsive to the negative going pulses.

For purposes of simplicity, I have illustrated the form of my invention shown in Figure 6 as providing a maximum count of only eight. Obviously, the number of segments in each row and the number of rows could be correspondingly increased to provide a greater maximum count. The number of movable segments 220 in the first row is equal to one-half the maximum count. In the case selected, since the maximum count is eight, four movable segments are required. The second row 256 includes four movable segments, each having a length which is nearly twice that of a segment of the first row 218. In rows following the second, the length of the movable segments is approximately doubled and the number of movable segments is halved. The distance between the centers of a pair of the stationary coupling segments associated with the second row 256 is equal to the length of segment 220 of the first row 218. In rows following the second row, the distance between centers of the stationary segments is doubled. The movable segments of each row are aligned about an arbitrary zero reference point for which the count is zero. The number of stationary coupling segments provided may be less than the number shown for the first two rows but the maximum number has been employed to provide a large capacitive coupling.

It may readily be demonstrated that the form of my invention shown in Figure 6 produces a digital representation in the natural binary code as a linear function of the relative poistion of the movable elements with respect to the stationary elements. If the movable segments are moving in the direction of the arrow B in Figure 6, the stationary segments 232 occupy respective relative intervals indicated by reference characters $y_0$ to $y_7$. Only the positions of the segment 232 third from the left as viewed in Figure 6 have been shown to prevent confusion. The corresponding relative positions of the segment 270 to the left as viewed in Figure 6 are indicated by $h_0$ to $h_7$. The respective relative positions of the segment 272 to the right as viewed in Figure 6 are indicated by $g_0$ to $g_7$. The pair of segments 270 and 272 which I have just described is that pair associated with the dimension $q_1$. Similarly, the corresponding relative positions of the respective segments 316 and 318 are indicated by $k_0$ to $k_7$ and $j_0$ to $j_7$. Assuming the selected segment 232 is in the interval $y_0$ where it is aligned with a segment 220, an output signal representing a "1" appears at terminal 238 while no signal appears at terminal 240. In the $h_0$ position, segment 270 may be aligned with a segment 266 or with a segment 258 or may be partially aligned with a pair of adjacent segments 266 and 258. If segment 270 were required at this time to transfer a signal, a possible ambiguity would exist. Since, however, conduction 252 carries no signal at this time, segment 270 is not required to transfer a signal so that the possibility of an ambiguity is eliminated. In the $g_0$ position, segment 272 is aligned with a segment 258 and may couple a signal thereto without a possible ambiguity. Since conductor 244 carries a signal at this time, the capacitive coupling provided by segments 272 and 258 and by capacitor rings 262 and 286 couples the signal to the output terminal 298 to represent a "1" thereat. Since no signal is passed to a segment 266, no output signal appears at terminal 300 so that a "0" is represented thereat. In the $k_0$ position of segment 316, the segment may be partially aligned with a segment 312 and partially aligned with a segment 304. If the segment 316 were required to couple a signal at this time, a possible ambiguity would exist. However, since conductor 296 carries no signal at this time, segment 316 is not required to couple a signal in the $k_0$ position. In the $j_0$ position, segment 318 is aligned with segment 304 and may couple a signal thereto without ambiguity. Since conductor 294 carries a signal at this time, the capacitive coupling between segments 318 and 304 and between capacitor rings 308 and 332 couple the signal to amplifier 336 and thence to terminal 344 to represent a "1" at the terminal. Since no signal has been coupled to segment 312, a "0" is represented at terminal 346. The operation of my device for the remaining positions of the segments is similar. I select the outputs of my device from terminals 346, 300 and 240. The resultant representations at these terminals for the various positions of the segments is a digital representation in the natural binary code of the numbers from 0 to 7. In the following table, I have indicated the various outputs appearing at the terminals, and the numbers represented thereat, in both binary and decimal notation for both the output representative of position and the complementary output as the movable segments move with respect to the fixed coupling segments.

*Table II*

| Input coupling segment position | Terminal outputs | | | | | | Output at terminals 346, 300 and 240 | | Complementary output at terminals 344, 298 and 238 | |
|---|---|---|---|---|---|---|---|---|---|---|
| | 346 | 344 | 300 | 298 | 240 | 238 | Binary notation | Decimal notation | Binary notation | Decimal notation |
| $y_0$ | 0 | 1 | 0 | 1 | 0 | 1 | 000 | 0 | 111 | 7 |
| $y_1$ | 0 | 1 | 0 | 1 | 1 | 0 | 001 | 1 | 110 | 6 |
| $y_2$ | 0 | 1 | 1 | 0 | 0 | 1 | 010 | 2 | 101 | 5 |
| $y_3$ | 0 | 1 | 1 | 0 | 1 | 0 | 011 | 3 | 100 | 4 |
| $y_4$ | 1 | 0 | 0 | 1 | 0 | 1 | 100 | 4 | 011 | 3 |
| $y_5$ | 1 | 0 | 0 | 1 | 1 | 0 | 101 | 5 | 010 | 2 |
| $y_6$ | 1 | 0 | 1 | 0 | 0 | 1 | 110 | 6 | 001 | 1 |
| $y_7$ | 1 | 0 | 1 | 0 | 1 | 0 | 111 | 7 | 000 | 0 |

It will be appreciated that with my construction and alignment, except for the first row, no stationary segment is required to couple a signal unless its center line is within a quarter segment length of the center line of the segment with which it is associated. This arrangement prevents possible ambiguity at transfer points and permits of a misalignment between the stationary coupling segments and the movable segments. While I have shown my device as having a maximum count of only eight, it will readily be understood that many more divisions may be made by increasing the number of segments and the number of rows.

I have shown the length of the coupling segments for all but the first row to be approximately one-quarter the length of the moving segments with which they cooperate. When a transfer point is reached, the center of a coupling segment will be disposed opposite a point on the cooperating moving segment which is approximately one-quarter of a moving segment length distant from the center of the moving segment, or which is, in other words, approximately one-quarter of a moving segment length distant from an end of the moving segment. At a transfer point, then, one end of the coupling segment will be disposed opposite a point on the moving segment which is one-eighth of a moving segment length distanct from an end of the moving segment. It will be, therefore, appreciated that the allowable misalignment between stationary coupling segments and moving segments will be approximately $\pm 1/8$ the length of a moving segment. In the limiting case of a coupling segment of width approaching zero, the allowable misalignment increases to approximately $\pm 1/4$ the length of a moving segment. This limiting case is analogous to the point contact of a brush on a moving segment as in the conductively coupled form of my invention. However, in this degenerate limiting case, as the width of the coupling segments approaches zero, the capacitive coupling also approaches zero. On the other hand, if I were to choose a maximum coupling segment width equal approximately to one-half the length of an associated moving segment, the capacitive coupling would be thereby increased, but the allowable misalignment would thereby be reduced to zero. The width of a coupling segment, as shown in Figures 6 and 9, equal approximately to one-quarter the length of an associated moving segment, is a compromise value between the incompatible desirables of maximum capacitive coupling and maximum allowable misalignment, both of which may not be obtained simultaneously if I make amplifiers 290, 292, 336 and 338 simple cathode followers. I may achieve both maximum capacitive coupling and maximum allowable misalignment by substituting four additional trigger circuits, respectively, for the four amplifiers 290, 292, 336 and 338. These four trigger circuits may be identical to trigger circuit 242, and only the positive going output is used. Four additional loading capacitors are provided, one for each of the four additional trigger circuits, and connected between the input line of the four additional trigger circuits and ground, exactly as loading capacitor 254 for trigger circuit 242 is connected between input line 236 of trigger circuit 242 and ground. I make the coupling segments of maximum width or equal approximately to one-half the length of the associated moving segments to obtain maximum coupling. By critically adjusting either the magnitudes of the four additional loading capacitors or the sensitivities of the four additional trigger circuits, as for loading capacitor 254 or trigger circuit 242 of row 218, I may increase the allowable misalignment to approximately $\pm 1/4$ length of the associated moving segments.

Figure 7:
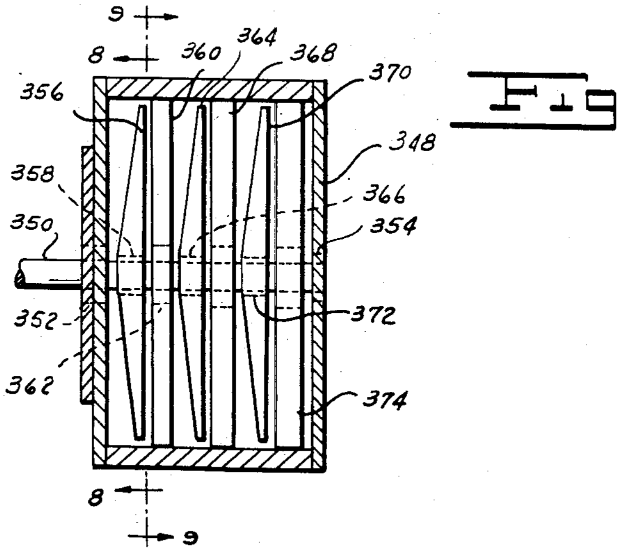
Figure 7 is a sectional view of the analogue-to-digital converter shown in Figure 6.

Referring now to Figures 7 to 9, this form of my device includes a housing 348 in which a shaft 350 is rotatably mounted by means of bearings 352 and 354 carried in the respective sides of the housing 348. The device is a three-section device, the first section of which includes a rotor 356 mounted on shaft 350 for rotation therewith by means of a spline or key 358. Rotor 356 mounts the movable segments and movable capacitor rings of my device. The stationary segments and stationary capacitor rings are carried by a stationary member 360 provided with a central opening 362 through which shaft 350 may extend to the next section of the device. The second section of the device includes a rotor 364, keyed to shaft 350 by a key 366, and a stationary member 368. The third section of the device includes a rotor 370, keyed to a shaft 350 by a key 372, and a stationary element 374. The air gap spacing between disk 356 and member 360 must be held constant to prevent the capacitive coupling from varying. This spacing should be small to increase the coupling and the resolution possible. For purposes of illustration, I have shown in Figures 8 and 9 rotor 356 and the stationary mounting means 360 as providing a maximum count of eight as shown in Figure 6. For convenience, I employ only one section of the form of my device shown in Figure 7, thereby assuming that I obtain sufficient capacitance on one rotor disk 356 to provide three rows of segments. If more capacitance were required, I might put only one row on each disk. If the capacitance is sufficient to provide three rows on one disk 356, I may employ all three disks to increase the maximum count. In such case, I would obtain a total of nine digits with a maximum count of $2^9=512$. Thus I may obtain a large count without using an excessively large disk. When only a single section of my device need be used, all the necessary rows may be arranged on a single rotor 356. Since I have chosen for convenience to represent only eight divisions, I need use only the rotor 356 and the associated member 360 of the device.

Referring now to Figure 8, the rotor 356, which may be made of an insulating material such as glass, carries the movable elements which may conveniently be photographically printed, etched or engraved on the rotor. As can be seen by referring to Figure 9, the mounting member 360 may also be of glass and have the stationary elements photographically applied thereon. Electrical connections to the required external circuitry may be made by any convenient means not shown. While I have shown this form of my device as being employed to indicate shaft rotation, it will readily be appreciated that any other type of relative motion could be indicated in a similar manner.

In operation, in the form of my device shown in Figures 1 to 5, when it is desired to divide a circle into sixteen segments, that is, to represent sixteen positions of a shaft, the first section only of the device need be employed. Disk 170 is driven at the angular velocity of the shaft whose position is to be represented. The movable segments carried by disk 170 are to be moved relative to the brushes carried by holder 186 to produce an output at terminals 160, 122, 84 and 32 which is a digital representation in the natural binary code of the shaft position. This output signal representation will be in accordance with Table I. If a two-speed arrangement is desired, disk 190 would divide a circle into eight segments and disk 170 would divide each of these eight segments into sixteen segments.

The unit shown in Figures 1 to 5 produces an extremely accurate digital representation of the angular shaft position. It requires only a small torque load and permits a misalignment between a brush and a segment with which it is associated of a quarter segment. It provides an unambiguous representation since an instantaneous change of the representation in the first row is provided at transfer points. Further, it prevents ambiguity at transfer points in the succeeding rows, since no brush is required to pass a signal when it is more than a quarter segment distant from the center of a segment with which it is associated. The power consumed by this unit is negligible. The unit itself operates either on direct current or from voltage pulses. It may be operated at high speed and may be read without stopping the shaft whose position is being represented.

In operation of the form of my invention shown in Figures 4 to 6, the input shaft 350 is driven at the angular speed of a shaft whose position is to be represented. If only a single section is used, as the disk 356 rotates with respect to the stationary member 360, a digital representation of the shaft position appears at the output terminals 346, 300 and 240 in the manner described in connection with Table II. If a greater number of binary digits is required, the additional rows of movable segments are provided on disks 364 and 370 and the rows of additional associated stationary coupling segments are provided on members 368 and 374. This form of my device similarly provides unambiguous operation and gives an extremely accurate representation of the position of a movable element with respect to a stationary element.

For both forms of my invention, I have described and shown a configuration which gives the digital representation as a linear function of the relative motion. By varying the lengths of the segments and spaces of the row for the least significant digit according to some arbitrary function of the relative motion and by correspondingly varying the lengths of the segments of the remaining rows, I may obtain the binary digital representation as that arbitrary function of the relative motion.

It will be seen that I have accomplished the objects of my invention. I have provided an analogue-to-digital converter which gives an accurate, unambiguous digital representation in the natural binary code of a movable element with respect to a stationary element. My device provides a large permissible misalignment between a stationary element and the movable element with which it is associated. My unit is small and light. It requires little driving torque. The capacitive form of my invention presents a high capacity to the output circuits so that stray capacitances do not affect the operation of the device. My device may be driven at a high speed and may be read without arresting the shaft in connection with which it is employed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. An analogue-to-digital converter for producing a binary digital representation of the relative movement between two members including in combination a first member, a first row of elements mounted on the first member, a second member, means mounting the first and second members for relative movement, a source of excitation voltage, means including means mounted on the second member for coupling the excitation voltage to the first row, means for deriving two outputs from the first row, one of said first row outputs representing a one in the binary code when the other of said outputs represents a zero in the binary code and the other of said outputs representing a one in the binary code when said one of the outputs represents a zero in the binary code such that said first row outputs are complementary to one another, a second row of elements mounted on the first member, means including means mounted on the second member for electrically coupling the two complementary outputs to the second row, and means for deriving an additional output from the second row.

2. An analogue-to-digital converter as in claim 1 in which the first row of elements includes two conductive segments each of predetermined length spaced apart a predetermined distance thereby to define a non-conductive space of said predetermined length therebetween.

3. An analogue-to-digital converter as in claim 1 in which the second row of elements includes two conductive segments separated by an auxiliary conductive segment.

4. An analogue-to-digital converter as in claim 1 in which the coupling means for the excitation voltage includes a brush mounted on the second member.

5. An analogue-to-digital converter as in claim 1 in which the coupling means for the two complementary outputs includes a brush mounted on the second member.

6. An analogue-to-digital converter as in claim 1 in which the coupling means for the excitation voltage includes a capacitive coupling segment mounted on the second member.

7. An analogue-to-digital converter as in claim 1 in which the coupling means for the two complementary outputs includes a capacitive coupling segment mounted on the second member.

8. An analogue-to-digital converter as in claim 1 in which the coupling means for the two complementary outputs includes two brushes mounted on the second member and spaced apart a predetermined distance.

9. An analogue-to-digital converter as in claim 1 in which the coupling means for the two complementary outputs includes two capacitive coupling segments mounted on the second member and spaced apart a predetermined distance.

10. An analogue-to-digital converter as in claim 1 in which the means for deriving one of the two complementary outputs includes auxiliary logic circuitry.

11. An analogue-to-digital converter as in claim 1 in which the coupling means for the two complementary outputs includes a unilateral impedance.

12. An analogue-to-digital converter as in claim 1 in which the first row of elements includes two conductive segments connected to a common conductor and spaced apart to define a non-conductive space.

13. An analogue-to-digital converter as in claim 1 in which the second row of elements includes two conductive segments separated by an auxiliary conductive segment, and in which the two segments are both connected to a first conductor and the auxiliary segment is connected to a second conductor.

14. An analogue-to-digital converter as in claim 1 in which the coupling means for the excitation voltage includes a capacitive coupling segment, and in which the means for deriving one of the two complementary outputs includes an auxiliary regenerative trigger circuit.

15. An analogue-to-digital converter for producing a binary digital representation of the relative motion between two members including in combination a first member, a first row of elements mounted on the first member, a second member, means mounting the first and second members for relative motion, a source of excitation voltage, means including means mounted on the second member for coupling the excitation voltage to the first row, means for deriving a first two outputs from said first row, one of said outputs representing a one in the binary code when the other of said outputs represents a zero in the binary code and the other of said outputs representing a one in the binary code when said one output represents a zero in the binary code such that said first two outputs are always complementary to one another, a second row of elements mounted on the first member, means for electrically coupling the first two complementary outputs to the second row, and means for deriving two additional outputs from the second row, said two additional outputs being complementary to one another such that one of said additional outputs represents a one in the binary code when the other of said additional outputs represents a zero in the binary code and said other additional output represents a one in the binary code when said one additional output represents a zero in the binary code.

16. An analogue-to-digital converter as in claim 15 in which the coupling means for the first two complementary outputs includes a unilateral impedance.

17. An analogue-to-digital converter as in claim 15 in which the second row of elements includes two conductive segments separated by an auxiliary conductive segment, and in which the means for deriving one of the two additional complementary outputs includes the auxiliary conductive segment.

18. An analogue-to-digital converter for producing a digital representation of the relative position of a pair of members including in combination a first member, a plurality of rows of segments carried by said first member, a second member, means for mounting said first and second members for relative movement, a source of excitation voltage, means for coupling the excitation voltage to the segments of said first row, means for deriving a pair of output signals from said first row such that one of said signals represents a one in the binary code when the other of said signals represents a zero in the binary code and such that said one of said signals represents a zero in the binary code when the other of said signals represents a one in the binary code and such that said first row output signals are always complementary to one another, means comprising means carried by the second member for electrically connecting preceding rows to the segments of succeeding rows to cause each of said rows succeeding said first row continuously to produce pairs of output signals, each of which pairs of succeeding row output signals includes one succeeding row signal representing a one in the binary code when the other succeeding row signal represents a zero in the binary code and said one succeeding row signal represents a zero in the binary code when the other succeeding row signal represents a one in the binary code whereby one signal of each of said first row pair and one signal of each of said succeeding row pairs forms a bit of the digital representation of the relative position of said first and second members.

19. An analogue-to-digital converter as in claim 18 in which said means carried by said second member comprises pairs of spaced brushes.

20. An analogue-to-digital converter as in claim 18 in which the segments of said succeeding rows have lengths equal to substantially twice the lengths of the segments of preceding rows and in which said means carried by said second member comprise pairs of brushes adapted to engage the segments of a succeeding row, and means mounting the brushes of a pair in spaced relationship with a spacing substantially equal to half the length of a segment of the succeeding row with which they are associated.

21. An analogue-to-digital converter as in claim 18 in which said rows of segments are disposed in concentric circles.

22. An analogue-to-digital converter as in claim 18 in which said means carried by said second member comprise pairs of spaced capacitor segments adapted to coact with the segments of a succeeding row, and means mounting said capacitor segments with a spacing substantially equal to half the length of a segment of the succeeding row with which they are associated.

23. An analogue-to-digital converter as in claim 18 in which said electrical connecting means comprises respective pairs of continuous conducting strips carried by said first member and means for connecting alternate segments of a succeeding row to respective strips of a pair.

24. An analogue-to-digital converter as in claim 18 in which electrical connecting means comprise respective pairs of continuous conducting strips associated with the respective succeeding rows and means connecting alternate segments of a row with respect ones of a pair of strips and in which the means carried by the second member comprise respective pairs of capacitive coupling rings associated with said pairs of continuous conducting strips.

25. An analogue-to-digital converter as in claim 18 in which said electrical connecting means comprise pairs of slip rings associated with the respective rows and means connecting alternate segments of a row with the respective rings of a pair and in which said means carried by said first member comprise first brushes for engaging the respective slip rings of a pair and a second pair of brushes electrically connected to the respective brushes of the first pair and adapted to engage the segments of a succeeding row.

26. An analogue-to-digital converter for producing a binary digital representation of the relative motion between two members including in combination a first member, a first row of elements mounted on the first member, a second member, means mounting the first and second members for relative motion, a source of excitation voltage, means including means mounted on the second member for coupling the excitation voltage to the first row, means for deriving a first two outputs complementary to one another from the first row such that a first output represents a one when the second output represents a zero and such that the second output represents a one when the first represents a zero, a second row, means for deriving two additional outputs complementary to one another from the second row such that a first of the additional outputs represents a one when the second represents a zero and such that the second represents a zero when the first represents a one, a third row of elements, means mounting the third row for movement relative to the second member, means for electrically coupling the two additional complementary outputs to the third row, and means for deriving an output from the third row.

27. An analogue-to-digital converter as in claim 26 in which said third row element mounting means is said first member.

28. An analogue-to-digital converter as in claim 26 in which said third row element mounting means is a third member and including a gear train connecting said third member to said first member.

References Cited in the file of this patent

UNITED STATES PATENTS

| | | |
|---|---|---|
| 2,192,421 | Wallace | Mar. 5, 1940 |
| 2,318,591 | Couffignal | May 11, 1943 |
| 2,409,876 | Martin | Oct. 22, 1946 |
| 2,666,912 | Gow et al. | Jan. 19, 1954 |
| 2,676,289 | Wulfsberg | Apr. 20, 1954 |
| 2,713,680 | Ackerlind | July 19, 1955 |
| 2,747,797 | Beaumont | May 29, 1956 |